(12) United States Patent
Uchiyama

(10) Patent No.: US 7,222,932 B2
(45) Date of Patent: May 29, 2007

(54) PRINTER

(75) Inventor: Hiroyuki Uchiyama, Asaka (JP)

(73) Assignee: Fujifilm Corporation, Tokyo (JP)

( * ) Notice: Subject to any disclaimer, the term of this patent is extended or adjusted under 35 U.S.C. 154(b) by 301 days.

(21) Appl. No.: 10/951,624

(22) Filed: Sep. 29, 2004

(65) Prior Publication Data

US 2005/0088506 A1    Apr. 28, 2005

(30) Foreign Application Priority Data

Sep. 30, 2003    (JP) .............................. 2003-339976

(51) Int. Cl.
B41J 29/38 (2006.01)
B41J 29/393 (2006.01)
B41J 2/015 (2006.01)

(52) U.S. Cl. .......................... 347/17; 347/19; 347/131; 347/236

(58) Field of Classification Search ................. 347/17, 347/19, 118, 130, 133, 236, 252, 238, 248
See application file for complete search history.

(56) References Cited

U.S. PATENT DOCUMENTS

| 6,130,700 A | * | 10/2000 | Murayama et al. ......... 347/240 |
| 2002/0024587 A1 | * | 2/2002 | Inage et al. ................. 347/248 |
| 2004/0041913 A1 | * | 3/2004 | Takasumi et al. ........ 348/207.2 |

FOREIGN PATENT DOCUMENTS

JP    2000-302325 A    10/2000

* cited by examiner

*Primary Examiner*—Lamson Nguyen
*Assistant Examiner*—Sarah Al-Hashimi
(74) *Attorney, Agent, or Firm*—Sughrue Mion, PLLC

(57) ABSTRACT

The present invention provides a compact printer that can print images of high quality even if the images are printed successively. A temperature at the time of turn-on is detected by a temperature sensor, and a CPU estimates the temperature of an exposure head at the start of exposure based on the detected temperature. The CPU creates print data by referring to a look-up table in accordance with the estimated temperature and drives the exposure head in accordance with the print data, thereby forming a latent image on an instant film sheet.

6 Claims, 13 Drawing Sheets

Fig.6 Block diagram of electric system

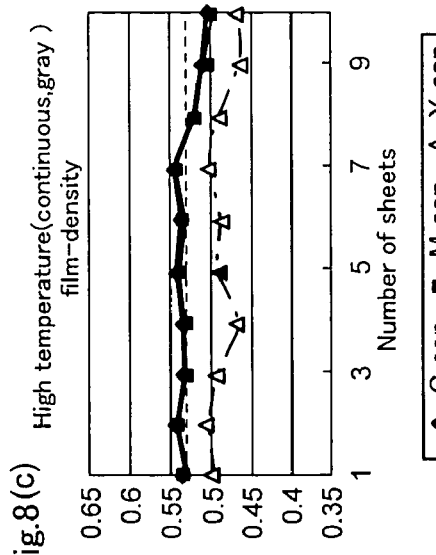
Fig.8(a) Low temperature(at intervals,gray) film-density
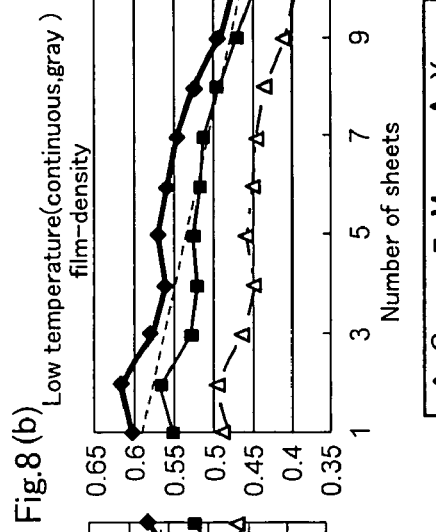
Fig.8(b) Low temperature(continuous,gray) film-density
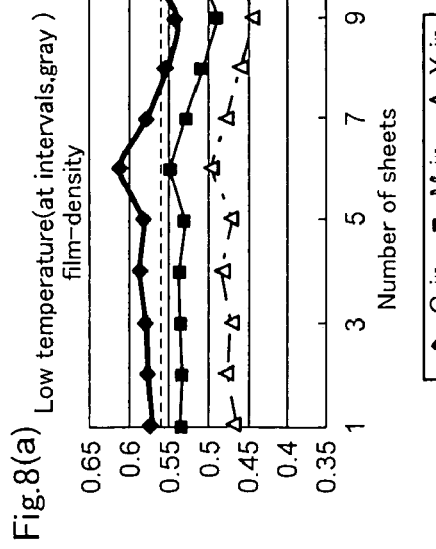
Fig.8(c) High temperature(continuous,gray) film-density
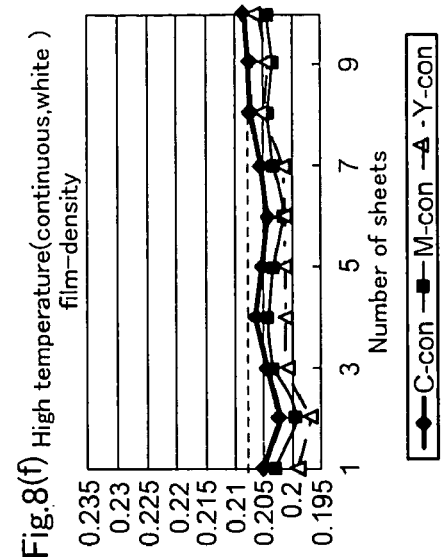
Fig.8(d) Low temperature(at intervals,white) film-density
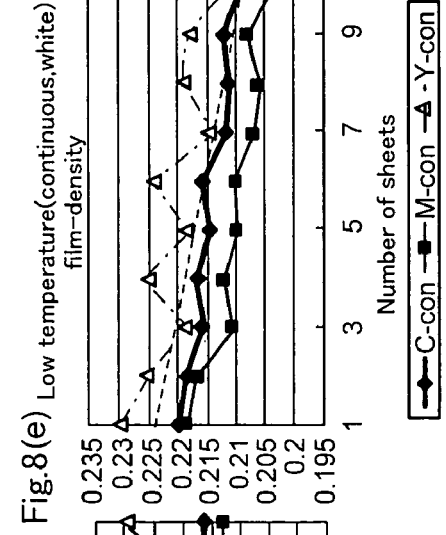
Fig.8(e) Low temperature(continuous,white) film-density
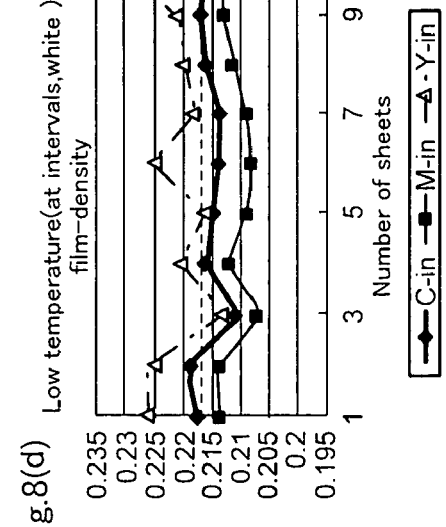
Fig.8(f) High temperature(continuous,white) film-density Default value

| Threshold | 8-bit data | Reduced value (degrees C) |
|---|---|---|
| Tth_A | [T.B.D] | 0 |
| Tth_B | [T.B.D] | 8 |
| Tth_C | [T.B.D] | 11 |
| Tth_D | [T.B.D] | 14 |
| Tth_E | [T.B.D] | 18 |
| Tth_F | [T.B.D] | 22 |
| Tth_G | [T.B.D] | 27 |
| Tth_H | [T.B.D] | 33 |
| Tth_I | [T.B.D] | 45 |

| Determination result | Printer operation | Remarks |
|---|---|---|
| $T \leq Tth\_A$ | Prohibition(locked) | Display error code on LCD panel |
| $Tth\_A < T < Tth\_B$ | Select LUT_A | |
| $Tth\_B \leq T < Tth\_C$ | Select LUT_B | |
| $Tth\_C \leq T < Tth\_D$ | Select LUT_C | |
| $Tth\_D \leq T < Tth\_E$ | Select LUT_D | |
| $Tth\_E \leq T < Tth\_F$ | Select LUT_E | |
| $Tth\_F \leq T < Tth\_G$ | Select LUT_F | |
| $Tth\_G \leq T < Tth\_H$ | Select LUT_G | |
| $Tth\_H \leq T < Tth\_I$ | Select LUT_H | |
| $T \geq Tth\_I$ | Prohibition(locked) | Display error code on LCD panel |

Fig.14

// PRINTER

BACKGROUND OF THE INVENTION

1. Field of the Invention

The present invention relates to a printer that has a medium loading chamber that houses a recording medium on which a latent image can be formed by exposure and made visible by development, in which an image is recorded on a recording medium in the medium loading chamber by forming a latent image on the recording medium by exposure based on image data and developing the latent image.

2. Description of the Related Art

Some of printers of this type use an exposure head to form a latent image on an instant film sheet.

The exposure head has light emitting elements emitting red light, green light and blue light, respectively. A latent color image is recorded on an instant film by adjusting the quantity of light emitted by each light emitting element by a corresponding shutter in a liquid-crystal shutter array. The adjustment by each shutter in the liquid-crystal shutter array involves controlling the opening time, that is, the shutter speed of the shutter to provide a color gradation on the instant film according to the quantity of red, green or blue light received thereon when the shutter is open.

Printers provided with such an exposure head are used in various areas of various ambient temperatures or regardless of season. The printers used at different ambient temperatures may record images with varied gradations on recording media.

Thus, in order that the printers offer similar performance at different ambient temperatures, they have a look-up table for temperature compensation that enables images to be recorded with equal quality.

Even if the temperature control is conducted by the technique described above, if the printer outputs images successively after the printer is turned on, the temperature detected by the sensor at the time of turn-on may not be related to the current temperature of the exposure head, and thus, a blurred image may result. To avoid this, a temperature sensor may be provided on the exposure head to detect the temperature of the exposure head before exposure. However, providing the temperature sensor on the head results in an increase in size of the exposure head.

Besides, to address such a problem, according to another approach, the temperature control is achieved using a cooling mechanism without using the temperature sensor (see Japanese Patent Laid-Open No. 2000-302325). However, providing the cooling mechanism results in an increase in size of the entire apparatus.

SUMMARY OF THE INVENTION

In view of such circumstances, the present invention provides a compact printer that can print images of high quality even if the images are printed successively.

A printer according to the present invention is a printer having a medium loading chamber that houses a recording medium on which a latent image is formed by exposure and made visible by development, in which an image is recorded on the recording medium in the medium loading chamber by forming a latent image on the recording medium by exposure based on image data and developing the latent image, including:

an image data acquisition section that externally acquires first image data;

an exposure head that performs exposure of the recording medium in the medium loading chamber based on second image data to form the latent image on the recording medium;

a developing section that develops the latent image formed by the exposure head;

a temperature sensor that measures a temperature at the time when the printer is turned on, a temperature estimation section that has multiple pieces of temperature estimation information prepared for temperatures measured by the temperature sensor, the temperature estimation information being used for determining an estimated value of the temperature of the exposure head from the elapsed time after the turn-on, and determines an estimated value of the temperature of the exposure head depending on the elapsed time from the turn-on to the exposure based on temperature estimation information associated with the temperature measured by the temperature sensor at the time of turn-on; and image data conversion section that has multiple pieces of image data conversion information prepared for temperatures to compensate a variation of the quantity of exposure light applied to the recording medium due to a variation of the temperature of the exposure head and converts the first image data to the second image data based on image data conversion information associated with the estimated temperature value determined by the temperature estimation section.

In the printer according to the present invention, the temperature sensor detects a temperature at the time when the printer is turned on, the temperature estimation section estimates the temperature of the exposure head based on the detected temperature, and the image data conversion section converts the first image data to the second image data based on the estimated temperature. Thus, since the temperature sensor does not directly detect the temperature of the exposure head, the exposure head can be controlled with reliability in accordance with the temperature detected by the temperature sensor, without any temperature sensor mounted on the exposure head. This makes the printer more compact.

The temperature sensor may be intended to measure the temperature in the medium loading chamber, and the exposure head may be disposed integrally with the medium loading chamber in an inner wall.

Thus, since the temperature in the medium loading chamber is detected by the temperature sensor, the temperature of the exposure head section including a photosensitive material, which is one of the recording media in the medium loading chamber, can be estimated. Thus, the quantity of exposure light applied to the photosensitive material or the like can be corrected adequately, and the resulting image has a high quality even if the temperature varies.

Furthermore, the printer further may have a battery chamber in which a battery is loaded and may be supplied with electric power from the battery loaded in the battery chamber.

For example, in the case where the printer has an automatic power-off function to extend the battery life, if printing is to be performed after the printer is turned off by the automatic power-off function, the temperature sensor detects the temperature at the time when the printer, once turned off, is turned on again, and the estimation section estimates the temperature at the start of exposure based on the detected temperature. Thus, the exposure head carries out exposure based on the estimated temperature, so that a clear image can be printed.

Furthermore, the exposure head may have an array of liquid crystal shutters, and may open and close each shutter for a period of time depending on the second image data.

In this case, if the image data conversion information used by the image data conversion section in image data conversion is composed of a variation of the quantity of exposure light applied to the recording medium due to a variation of the temperature of the exposure head and a variation of the quantity of exposure light applied to the recording medium due to a variation of the temperature of a liquid crystal shutter, exposure can be achieved with reliability.

As described above, according to the present invention, there is provided a compact printer that can print images of high quality even if the images are printed successively.

BRIEF DESCRIPTION OF THE DRAWINGS

FIGS. 8a–8f shows variations of the quantities of exposure light for exposures of plural instant film sheets performed by the exposure head at a low temperature, and variations of the quantities of exposure light for exposures of plural instant film sheets performed continuously by the exposure head at a high temperature;

FIG. 14 is a table showing processings performed by the CPU depending on the estimated temperature.

DETAILED DESCRIPTION OF THE INVENTION

Figure 1:
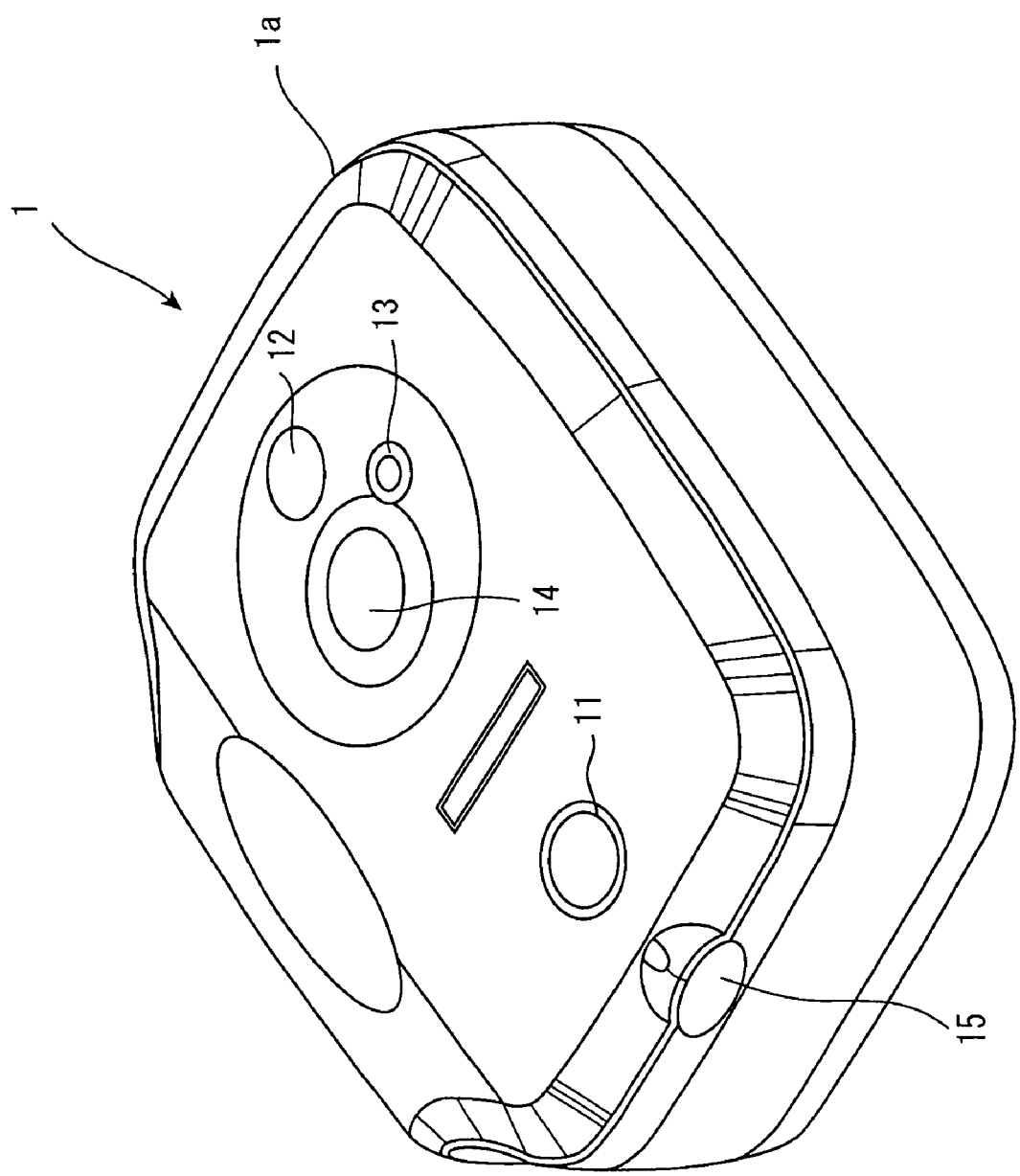
FIG. 1 is a perspective top view of a printer according to an embodiment of the present invention.

FIG. 1 is a perspective front view of a printer according to an embodiment of the present invention.

The printer is used in conjunction with a cellular phone or the like. The printer receives image data from the cellular phone and records an image on an instant film sheet. The instant film sheet corresponds to a recording medium according to the present invention.

Some of recent cellular phones carry out infrared communications complying with the Infrared Data Association (IrDA). Using the infrared communications, a cellular phone terminal can transmit information to another information device, and if the terminal is a camera cellular phone, it can transmit image data to the printer.

When image data representing a picture taken by a camera cellular phone or image data transmitted via e-mail etc. to a cellular phone is infrared-communicated to the printer according to the present invention, the printer records an image on an instant film sheet based on the image data and further can rerecord the recorded image onto another recording medium through manipulation of a print switch.

An arrangement of the printer according to this embodiment will be described with reference to FIG. 1.

A printer 1 is a portable one which is small and light enough to be held by hands together with a cellular phone for image recording. A film pack is loaded in a housing 1a of the printer 1, and an image is recorded on each of multiple instant film sheets stacked in the film pack.

The housing 1a of the printer 1 has a power supply switch 11 for switching between the turning on and turning off of the printer 1 (referred to a power supply SW, hereinafter), a print switch 12 (referred to as a print SW, hereinafter), and a print data correction switch 13 (referred to as a print data correction SW, hereinafter). In the middle of the housing, there is provided an LCD panel 14, on which the count of remaining instant film sheets, the details of the print data correction SW 13 or the like are displayed. In addition, a light-receiving element 15 that receives image data transmitted via infrared communication described above is provided at a position where the cellular phone can be readily opposed to the printer, specifically, at an edge of the housing 1a in this drawing. Although not shown in FIG. 1, the printer 1 has an USB port.

The print data correction SW 13 is a switch for adjusting the density (dark or light) of the image. When the print data correction SW 13 is in the Normal position, the image based on the transmitted image data is recorded on the instant film sheet without being processed. When the print data correction SW 13 is switched to a Dark position, the image based on the image data is recorded on the instant film sheet with the tone of the entire image being somewhat darken. When the print data correction SW 13 is switched to a Light position, the image is recorded on the instant film sheet with the tone of the entire image being somewhat lighten. If the print data correction SW 13 is manipulated before manipulating the print SW 12, pictures of the same composition making various impressions can be obtained.

If the print SW is manipulated, the image data is offset by an image processing section which will be described later, and the density of the entire image is adjusted.

Figure 2:
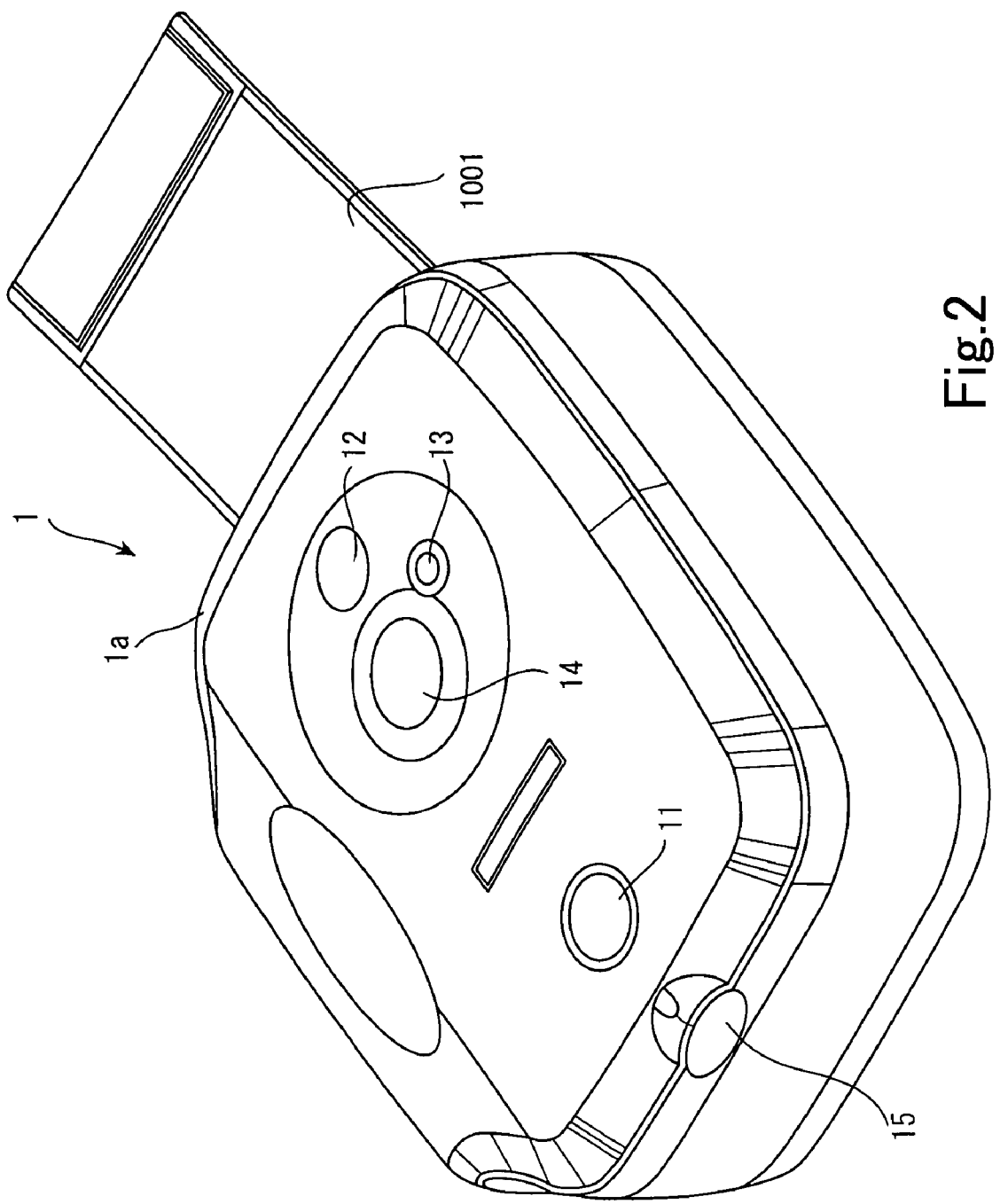
FIG. 2 shows an instant film sheet which is being ejected from the printer in which the instant film sheet has been loaded.

FIG. 2 shows an instant film sheet 1001 which is being ejected from an ejection port of the printer while making a latent image thereon visible after the latent image is recorded thereon by an exposure head described later.

Once the printer receives image data transmitted externally via infrared or USB communication, a latent image is recorded on an instant film sheet through exposure based on the received image data. As shown in FIG. 2, when the instant film sheet 1001 having the latent image recorded thereon is ejected, the latent image is made visible and output to the outside of the printer 1. If the print SW 12 is manipulated after that, the same image is recorded on another instant film sheet 1001 which will be explained later, and the instant film sheet 1001 is ejected as shown in FIG. 2.

Figure 3:
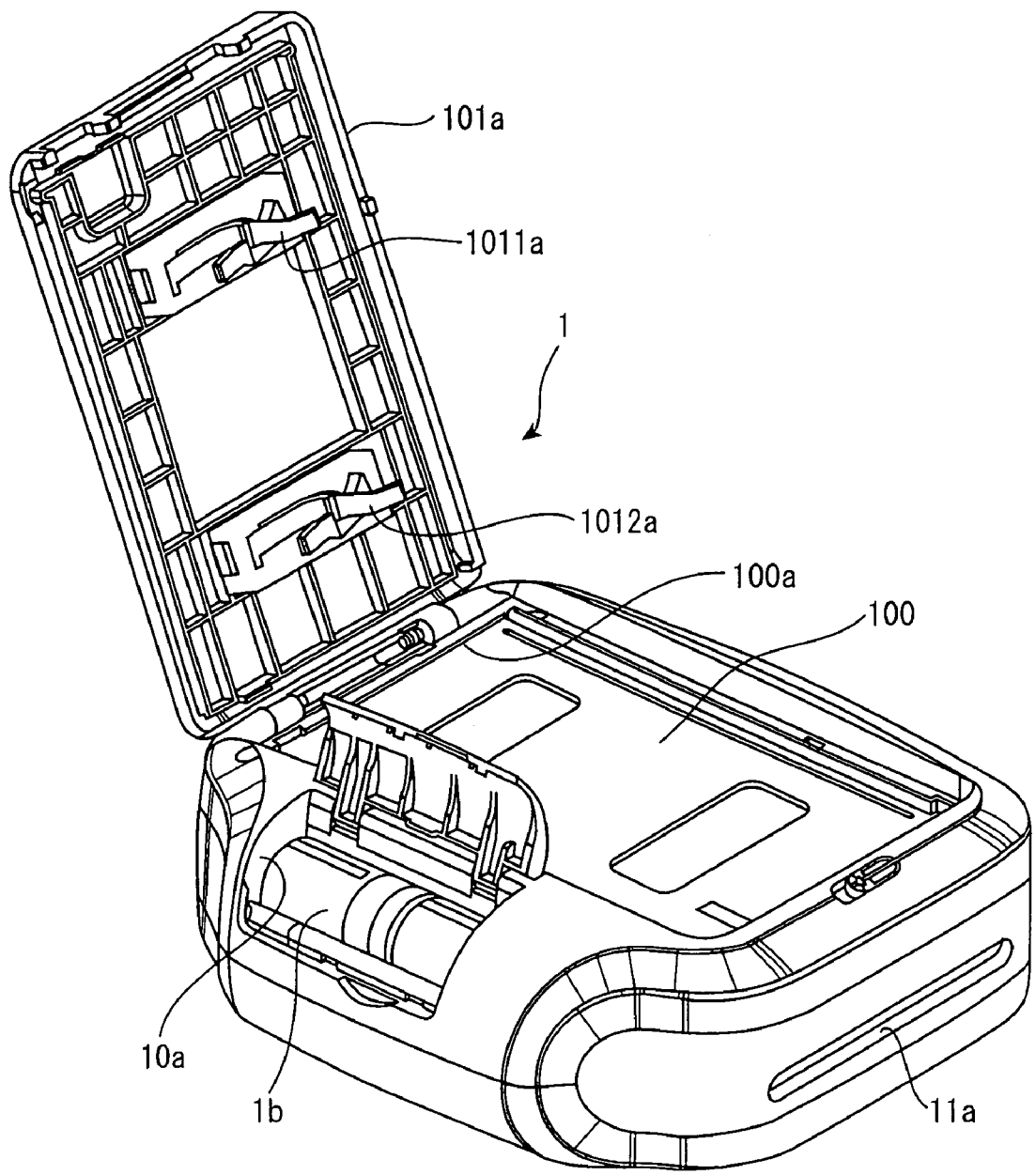
FIG. 3 is a perspective rear view of the bottom of the printer.

FIG. 3 is a perspective rear view of the bottom of the printer 1.

At the bottom of the printer 1, there is provided a film door 101a that enables loading of the film pack 100. The film door 101a is opened to load the film pack 100 into a film loading chamber 100a as shown in FIG. 3. The film loading chamber 100a corresponds to the medium loading chamber according to the present invention.

In addition, a battery loading chamber 10a into which a battery 1b serving as a power supply of the printer 1 is provided adjacent to the film loading chamber 100a. The battery loading chamber 10a also has a door, which is opened to load the battery 1b.

The film door 101a has two spring members 1011a and 1012a, which presses the instant film sheets stacked in the film pack 100 toward the top of the printer 1, which is located at the opposite side in FIG. 3. With such an arrangement, the uppermost one, film sheet 1001, of the instant film sheets in the film pack 100 is pushed up close to an ejection port 11a, and multiple light spot is recorded on the instant film sheet thus pushed up during exposure.

When a new film pack 100 is loaded, a light-shielding sheet is placed close to the ejection port 11a. Therefore, when the film door 101a is closed, the light-shielding sheet is ejected to the outside of the printer, and the uppermost film sheet 1001 is placed at the exposure position.

An inner arrangement of the printer 1 will be described.

Figure 4:
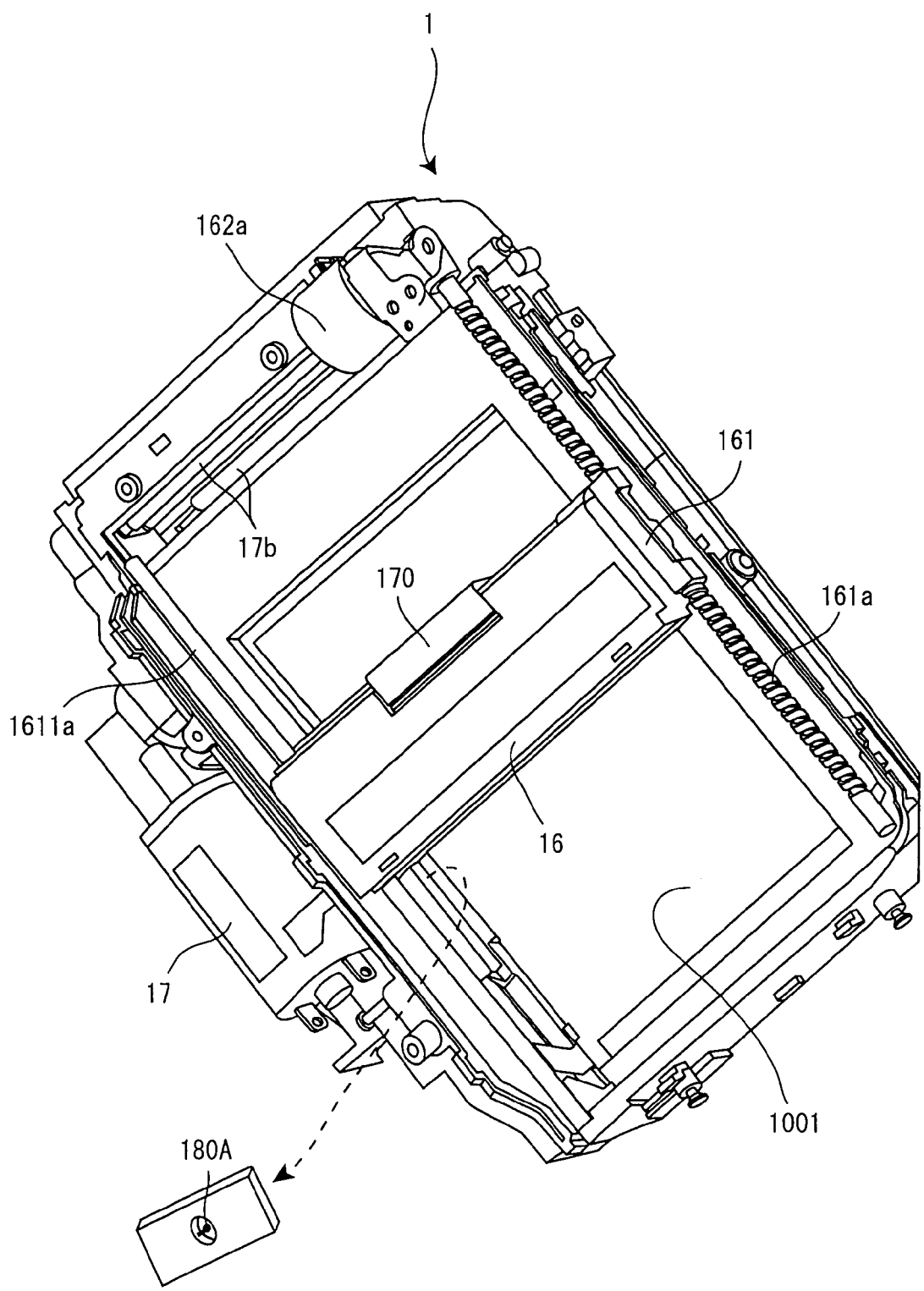
FIG. 4 is a perspective top view of the interior of the printer shown in FIG. 1 with a top cover thereof removed.

FIG. 4 shows the interior of the printer 1 with a top cover thereof being removed.

As shown in FIG. 4, an exposure head section 16 is provided opposing to the uppermost one 1001 of the instant film sheets stacked in the film pack 100 loaded in the printer.

The exposure head section 16 has a head key 161 at an end thereof, and the head key 161 resiliently engages with a thread part of a lead screw 161a supported on the housing 1a. On the other side of the exposure head section 16 opposite to the head key 161, a guide rod 1611a is provided, and an end of the exposure head 16 engages with the guide rod 1611a. Guided rectilinearly by the guide rod 1611a, the exposure head 16 moves by the action of engagement of the head key 161 with the lead screw 161a.

As shown in FIG. 4, a flat cable 170 is connected to the exposure head 16, and a control signal associated with the image data is supplied thereto via the flat cable 170 from a print control section described later. The control signal is to control the shutter speed of each shutter in a liquid crystal shutter array in the exposure head 16 describe later. A CPU, described later, estimates the temperature of the exposure head based on the temperature detected by a temperature sensor 180A mounted on the inner wall of the medium loading chamber, and the shutter speed of each shutter is controlled based on the estimated temperature. By controlling the shutter speeds, rays of light each corresponding to R, G and B are applied onto the instant film sheet, and thus, a latent color image consisting of 480 light spots (dots) arranged in the width direction of the instant film sheet is recorded. In the following description, the width direction, that is, the direction in which the shutters arranged one-dimensionally will be referred to as a main scanning direction. Thus, the shutters are electronically scanned in the main scanning direction to record 480 light spots of one line on the instant film sheet 1001. Once the 480 light spots are recorded on the instant film sheet 1001 in the main scanning direction by electronic scanning of the exposure head 16, a stepping motor 162a is driven based on a control signal from the print control section described later to cause the lead screw 161 to rotate a predetermined angle, and the exposure head successively records light spots in a direction orthogonal to the main scanning direction on a 480-dots basis. In the following description, the direction orthogonal to the main scanning direction will be referred to as a sub-scanning direction. In the sub-scanning direction, 640 lines of light spots are recorded on the instant film sheet, each line consisting of 480 light spots recorded in one main scanning of the exposure head.

Once the latent image representing the image by a set of light spots is recorded, the instant film sheet 1001 is inserted between spread rollers 17b to spread a developer in the instant film sheet 1001 across the sheet 1001, thereby making the latent image visible, and then, the instant film sheet is ejected to the outside of the printer. The instant film sheet 1001 is a self-developing photosensitive material. When the instant film sheet 1001 is inserted between the spread rollers 17b, the developer previously injected in the instant film sheet is spread uniformly across the instant film sheet, and thus, the latent image on the film sheet is made visible. In this way, the latent image is recorded on the instant film sheet by the exposure head applying light spots on the instant film sheet in the main scanning direction based on the image data while moving the exposure head in the predetermined sub-scanning direction orthogonal to the main scanning direction. A spread motor 17, the spread rollers 17b and a spread motor driver described later correspond to a developing section according to the present invention.

Now, an arrangement of the exposure head 16 will be described with reference to FIG. 5.

Figure 5:
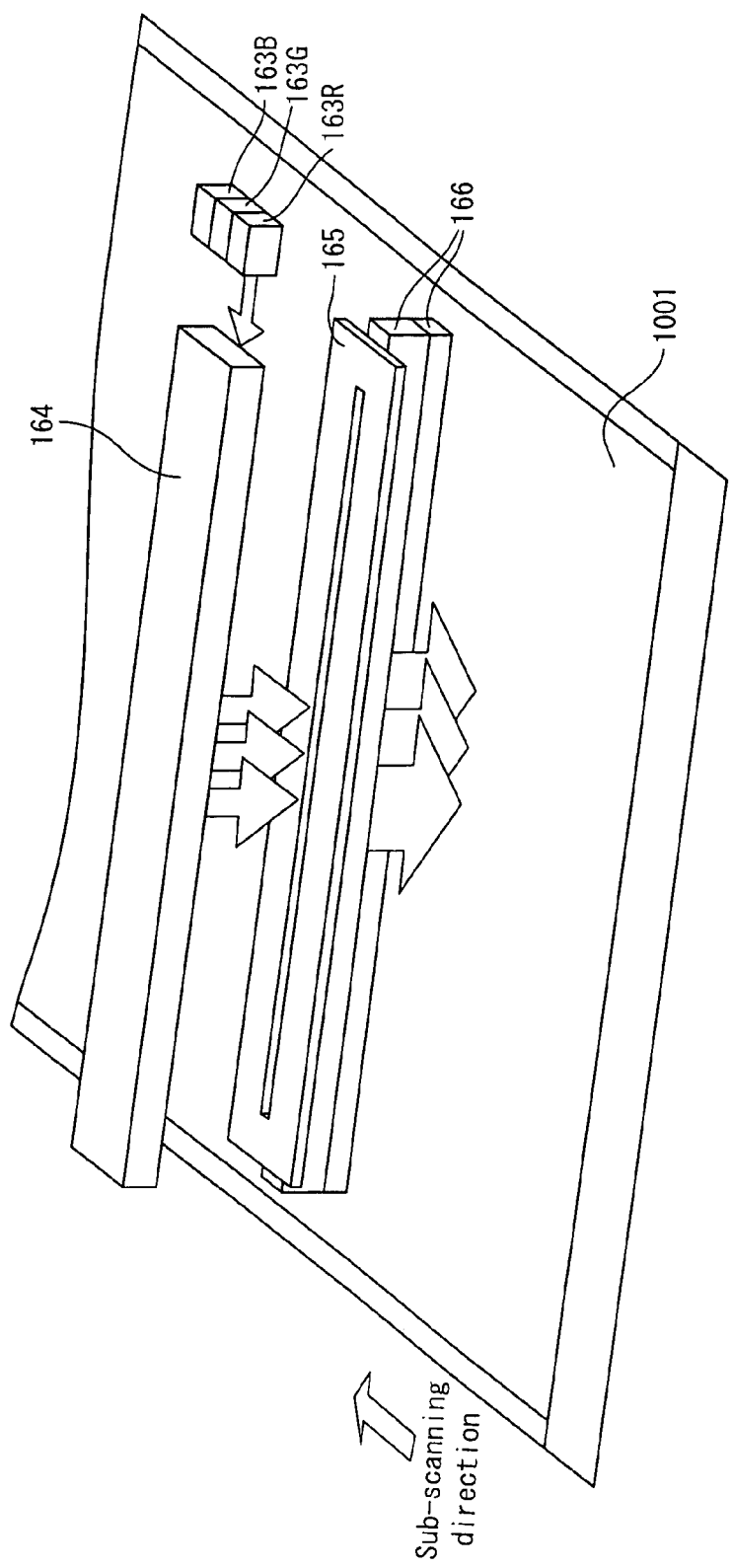
FIG. 5 is a schematic diagram showing an arrangement of an exposure head shown in FIG. 4.

FIG. 5 is a schematic diagram showing an arrangement of the exposure head.

In FIG. 5, an arrangement of light emitting elements 163R, 163G and 163B disposed at an end of a light guide 164 is schematically shown, and the directions of travel of red light, green light and blue light applied to the instant film sheet to form light spots are indicated by arrows.

As shown in FIG. 5, the exposure head has the light emitting elements 163R, 163G and 163B, the light guide 164, a liquid crystal shutter array 165, and a SELFOC lens® 166. The light emitting elements 163R, 163G and 163B emit red light (R), green light (G) and blue light (B), which are the three primary colors, respectively.

As shown in FIG. 5, the light emitting elements 163R, 163G and 163B for the three primary colors are disposed at an end of the light guide 164, and the rays of light emitted by the light emitting elements are successively guided toward the instant film sheet 1001 by the light guide 164. The paths of the rays of light guided toward the instant film sheet 1001 are modified by the light guide 164, and the red light, the green light and the blue light are applied to the instant film sheet 1001 in this order. Whenever the red light, the green light and the blue light are applied to the instant film sheet, they each pass through the corresponding shutter in the liquid crystal shutter array 165 and the following SELFOC lens® 166 and reach a same point on the instant film sheet 1001. The red light, the green light and the blue light adjusted in quantity by the respective shutters in the liquid crystal shutter array 165 are focused to one point on the instant film sheet 1001 by the SELFOC lens®, and in this way, multiple focused light spots are recorded on the instant film sheet 1001. The liquid crystal shutter array 165 used in this example has 480 elements, and the shutter speeds of the shutters are controlled based on the image data, thereby recording 480 light spots having gradations according to the image data on the instant film sheet 1001. Such recording is performed in the sub-scanning direction to form 640 lines. In this way, 640 by 480 light spots are recorded on the instant film sheet in the form of a latent image. The latent image corresponds to a color image recorded with the light of three colors, R, G and B focused on a same light spot by the lens 166. The exposure head having the light guide 164, the liquid crystal shutter array 165 and the SELFOC lens® 166, as well as the stepping motor 162a, the lead screw 161a, and the head key 161 fixed to the end of the exposure head described earlier constitute an image exposure section.

Figure 6:
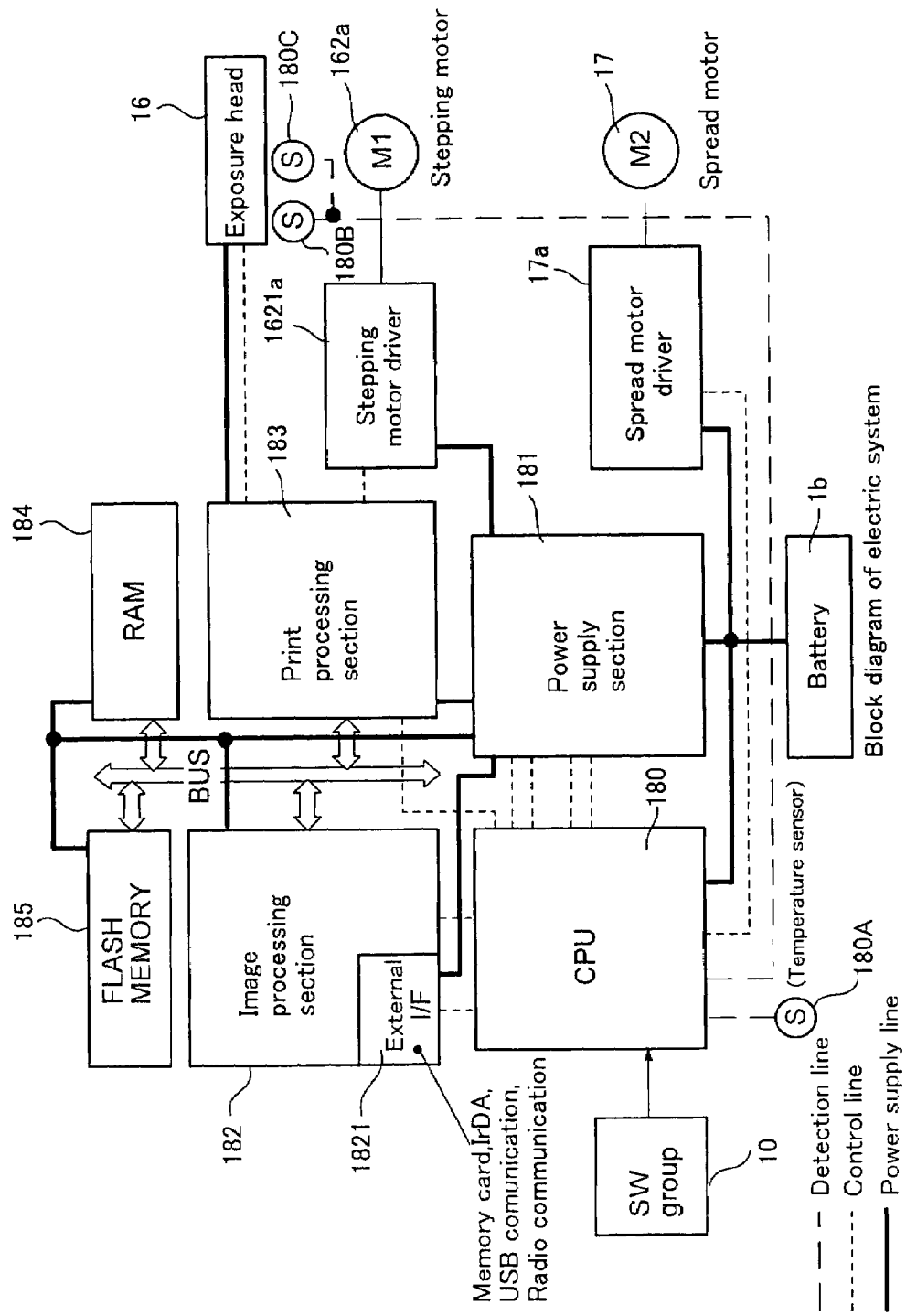
FIG. 6 is a block diagram showing a signal processing system in the printer.

FIG. 6 is a block diagram showing a control section that drives the exposure head 16 and the stepping motor 162a. In FIG. 6, lines of supply of electric power from the battery are shown as solid lines, and lines of control and detection are shown as dotted lines.

The printer has an automatic power-off function. In addition, to extend the battery life, the printer is divided into several power blocks so that electric power is supplied to only the block(s) that requires electric power.

Now, referring to FIG. 6, a power system of the printer intended for extending the battery life will be described.

As shown in FIG. 6, a CPU 180 is supplied with electric power directly from the battery 1b, so that the CPU can control the printer 1 even if the printer 1 is turned off. The CPU consumes only a little electric power. Furthermore, when the printer is off, the CPU consumes little electric power because it only monitors manipulation of the power supply switch. The battery supplies electric power directly to a power supply section 181 and a spread motor driver 17a. However, electric power supply to an image processing section 182, a stepping motor driver 1621a, a print processing section 183, a RAM 184 which is a volatile memory, a flash memory 185 which is a non-volatile memory, an external IF 1821 in the image processing section 182, a spread motor 17 and the like is controlled by the CPU 180, and no electric power is supplied to these sections unless instructed by the CPU.

With such an arrangement, the CPU 180 and the power supply section 181 enable electric power to be supplied only to the part(s) requiring electric power, and thus, the life of the battery 1b can be extended. As described above, once the battery 1b is loaded in the battery loading chamber 10a of the printer 1, the printer can operate for a long time on the battery 1b.

Now, an operation of the printer will be described with reference to FIG. 6.

Switches 10, each of which is shown in FIG. 1, are connected to the CPU 180, and the CPU 180 controls the sections shown in FIG. 6 in response to manipulation of the switches 10. If image data is externally sent to the printer via infrared or USB communications once the power supply SW 11, of the switches, is turned on, the CPU 180 controls the operation of the printer 1 and makes it record the image on an instant film sheet. Then, if the print SW 12 is manipulated, the CPU 180 controls the operation of the printer 1 and makes it record the same image on another instant film sheet. Furthermore, the CPU 180 is supplied with detection signals from the temperature sensor 180A for estimating the temperature of the exposure head, an origin sensor 180B for detecting the recording starting position of the exposure head, and an end-point sensor 180C for detecting the end position of the exposure head 16. The CPU 180 estimates the temperature of the exposure head 16 based on the detection signal from the temperature sensor 180A and makes the print processing section 183 control the shutter speed of each shutter in the exposure head 16 based on the estimated temperature. Furthermore, the CPU 180 makes the print processing section 183 control the motor based on the start and end positions of the movement of the exposure head 16 in the sub-scanning direction detected by the origin sensor 180B and the end-point sensor 180C.

Now, how the CPU 180 makes the sections operate when image data is externally transmitted to the printer once the power supply SW 11 is turned on will be described.

When image data is externally transmitted to the printer 1 by infrared communication, in response to the light-receiving element 15 receiving the infrared ray, the image processing section 182 having the external I/F 1821 outputs a signal indicating the reception to the CPU 180. Upon receiving the signal, the CPU 180 makes the image processing section 182 receive the image data and store the image data in the RAM 184 via a bus. The CPU 180, the image processing section 182 and the RAM 184 correspond to an image data acquisition section according to the present invention.

Once the image acquisition section acquires the external image data, the CPU 180 makes the image processing section 182 read the image data stored in the RAM 184 and generate print data. The print data is data having been appropriately processed in the image processing section to be used for controlling the shutter speed of each shutter in the exposure head 16. The print data is different from the image data acquired by the image acquisition section described above. In the following description, to discriminate between the two kinds of data, the image data acquired by the image acquisition section and stored in the RAM is referred to as pre-print data. The pre-print data corresponds to first image data according to the present invention, and the print data corresponds to second image data according to the present invention.

Once the image processing section 182 generates the print data, the CPU 180 makes the image processing section 182 transfer the print data to the print processing section 183, and the print processing section 183 controls the shutter speed of each shutter on a temperature basis. Then, the opening times, that is, shutter speeds of the shutters arranged in the main scanning direction are control based on the print data, and thus, the quantities of light of three colors, R, G and B passing through each shutter are adjusted. At this time, the CPU estimates the temperature of the exposure head section based on the temperature detected at the time of power-on by the sensor mounted on a spot facing formed in the frame. Once the CPU estimates the temperature of the exposure head at the time of start of exposure, a temperature compensation table is referred to with reference to the estimated temperature, and the print data is generated based on the estimated temperature. Then, the print processing section 183 controls the stepping motor driver 1621a to make the stepping motor 162a cause the exposure head 16 to scan in the sub-scanning direction. During each scanning, the print processing section 183 controls the shutter speeds of the shutters based on the print data to adjust the quantities of light of the light spots arranged in the sub-scanning direction. In this way, the quantities of light of all the light spots are adjusted, and the latent image representing the image composed of the light spots is recorded on the instant film sheet.

Once the latent image is recorded on the instant film sheet in this way, the CPU 180 turns off the power supply section supplying electric power for print control, and the battery supplies electric power to the spread motor driver 17a to drive the spread motor 17.

The spread motor 17 makes the spread rollers 17b rotate, thereby spreading the developer across the instant film sheet to make the latent image visible when the instant film sheet inserted between the spread rollers 17b is ejected from the printer.

The operations described above are those the CPU 180 makes the sections carry out when image data is externally transmitted to the printer once the power supply SW 11 is turned on.

Now, how the CPU 180 makes the sections operate when the print SW 12 is manipulated will be described.

In response to a manipulation of the print SW 12, the CPU 180 makes the image processing section 182 read the image data stored in the RAM 184. Based on the image data read, the image processing section 182 generates print data and transfers the print data to the print processing section 183. The print processing section 183 controls the shutters in the exposure head 16 based on the print data, thereby adjusting the quantities of the light applied to the instant film sheet. Since the quantities of the light applied to the instant film sheet are adjusted in this way, light spots corresponding to the image data are formed on the instant film sheet, and thus, the latent image corresponding to the image data is recorded.

In response to completion of the recording of the latent image, the CPU 180 issues an instruction to turn off the power supply section 181 to the power supply section 181 and issues an instruction to drive the spread motor 17 to the spread motor driver 17*a*.

The spread motor 17 drives a claw (not shown) for feeding the instant film sheet to the spread rollers 17*b*. The instant film sheet is fed to the spread rollers 17*b*, sandwiched between the spread rollers 17*b*, and then ejected to the outside of the printer. The developer previously injected in the instant film sheet is spread across the instant film sheet by the spread rollers 17*b* sandwiching the instant film sheet, and thus, the latent image is made visible.

When the print SW 12 is manipulated, the image according to the image data stored in the RAM 184 is recorded on the instant film sheet in the form of a latent image in this way.

Now, referring to FIG. 7, how the pre-print data, which is input data to the image processing section, is corrected and converted into the print data, which is output data, when the print data correction SW is manipulated will be described.

Figure 7:
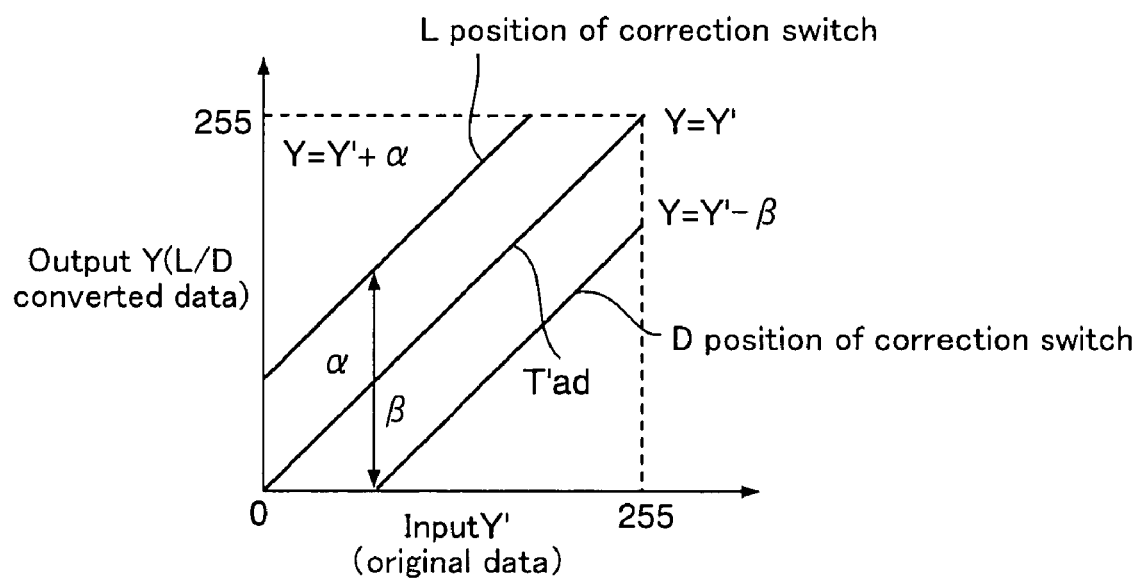
FIG. 7 is a diagram illustrating a correction of print data through manipulation of a print data correction SW.

FIG. 7 shows a correction of the pre-print data performed when the print data correction SW is manipulated. In FIG. 7, the vertical axis indicates the tone for the print data output from the image processing section, and the horizontal axis indicates the tone for the pre-print data input to the image processing section. As shown in FIG. 7, when the print data correction SW is in the Normal position, the input pre-print data is output as the print data without processing. When the print data correction SW is in a Dark position, the pre-print data is corrected and converted into print data with a tone lower than that for the Normal position, and when the print data correction SW is in the Light position, the pre-print data is corrected and converted into print data with a tone higher than that for the Normal position.

As shown in FIG. 7, correction data α added to the pre-print data is an offset value, and when the print data correction SW is switched to the Light position, the print data corresponding to the Normal position is offset by α. If the opening time of the liquid crystal shutter is controlled based on the α-offset print data, the quantity of the applied light increases, resulting in a lightened image. To the contrary, when the print data correction SW is switched to the Dark position, a darken image results.

As described above, the pre-print data received by the external I/F 1821 by infrared communication and stored in the RAM 184 is read and converted into print data by the image processing section, and the print data is passed to the print processing section for image recording. The pre-print data is corrected depending on the manipulation of the print data correction SW, and the density of the entire image is adjusted thereby. The print data with the image density adjusted is saved in the RAM.

As described above, if the print SW 13 is manipulated after the offset correction is performed through manipulation of the print data correction SW 12, the image recording is performed based on the offset print data.

A temperature compensation involved in controlling the shutter speed on a temperature basis during printing by the printer configured as described above will be described.

First, differences between the case where exposure is performed on the instant film sheet by the exposure head when the temperature sensor detects a low temperature and the case where exposure is performed on the instant film sheet when the temperature sensor detects a high temperature will be described.

FIG. 8 shows variations of the quantities of exposure light for exposures of plural instant film sheets performed by the exposure head when the temperature sensor detects a low temperature, and variations of the quantities of exposure light for exposures of plural instant film sheets performed by the exposure head when the temperature sensor detects a high temperature.

FIGS. 8(*a*) to 8(*c*) show cases where the shutters in the liquid crystal shutter are controlled to perform exposures of instant film sheets so as to provide a medium tone of gray. FIGS. 8(*d*) to 8(*f*) show cases where exposures of instant film sheets are performed so as to provide a white tone at the ends of the dynamic range. FIGS. 8(*a*) and 8(*d*) show cases where the exposures are performed in a state where the temperature of the exposure head varies only slightly. FIGS. 8(*b*), 8(*c*), 8(*e*) and 8(*f*) show cases where the exposures are performed in a state where the temperature of the exposure head varies significantly. The three lines in the drawings indicate the densities of complementary colors, cyan, which is a mixture of G and B, magenta, which is a mixture of R and B, and yellow, which is a mixture of R and G, which correspond to R, G and B, respectively. The horizontal axis indicates the number of films, and the vertical axis indicates the density. The higher the density indicated by the vertical axis, the less the quantity of light.

As shown in FIGS. 8(*a*) and 8(*d*), if the printings are performed at such time intervals that the temperature of the exposure head is constant, the quantity of light does not significantly vary both in the case of the gray tone and the case of the white tone. To the contrary, as shown in FIGS. 8(*b*) and 8(*e*), if the exposures are performed continuously, the quantity of light varies significantly. In addition, as shown in FIGS. 8(*c*) and 8(*f*), if the temperature sensor detects a high temperature, the quantity of exposure light does not significantly vary both in the case of the gray tone and the case of the white tone.

Figure 9:
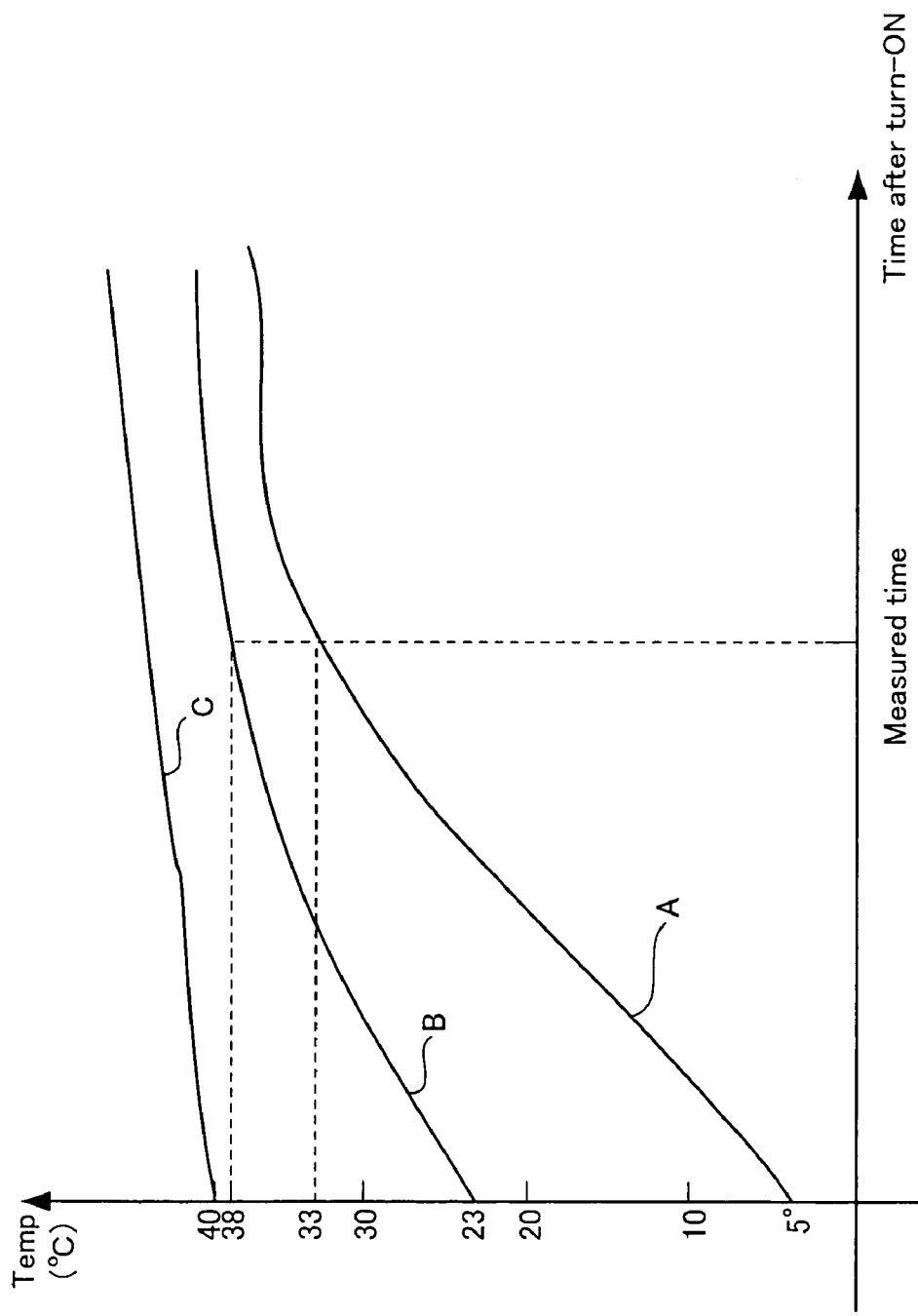
FIG. 9 is a graph for illustrating temperature estimation information.

FIG. 9 shows characteristics of such variations of the quantity of exposure light with the horizontal axis indicating the elapsed time after the turn-on.

FIG. 9 is a graph illustrating temperature estimation information used for determining the estimated value of the temperature of the exposure head depending on the elapsed time after the turn-on based on the temperature detected by the temperature sensor when the printer is turned on. In FIG. 9, the horizontal axis indicates the time, and the vertical axis indicates the temperature.

FIG. 9 shows plural pieces of temperature estimation information in the form of curves. FIG. 9 reflects the characteristics shown in FIG. 8 and shows that the lower the temperature detected by the temperature sensor at the time of turn-on, the more significantly the quantity of light varies with the lapse of time.

The plural pieces of temperature estimation information shown in FIG. 9 are temperature characteristics of the exposure head previously obtained by experiment or the like for estimation of the temperature of the exposure head. The CPU 180 retains the temperature characteristics in the form of a formula or table. The CPU 180 uses the formula or table to estimate the temperature at the start of exposure based on the temperature detected by the temperature sensor 180A at the time of turn-on. The plural temperature characteristics obtained by experiment or the like correspond to temperature estimation information according to the present invention, and the CPU 180 corresponds to a temperature estimation section according to the present invention.

First, in the temperature estimation, the CPU 180 selects one of the plural pieces of temperature estimation information (shown as curves in FIG. 9) indicating the temperature characteristics shown in FIG. 8, based on the temperature at the time of turn-on detected by the sensor immediately after the turn-on. Furthermore, the time until the exposure head starts exposure is measured with a timer, and the temperature associated with the measured time is regarded as the temperature of the exposure head at the start of exposure. For example, if the printer is supplied with no electric power for an extended period of time, so that the temperature thereof decreases, and the sensor detects a temperature of 5 degrees C. at the time of turn-on, the CPU 180 selects the curve A and estimates the temperature associated with the timer-measured time at 33 degrees C. Or, if the printer is supplied with electric power relatively shortly after it is once turned off, and the temperature sensor detects a temperature of 23 degrees C. at the time of turn-on, the curve B is selected, and the temperature associated with the timer-measured time is estimated at 38 degrees C. If a temperature lying between the plural curves, for example, between the curves A and B, between the curves B and C is detected by the temperature sensor, the estimated temperature is calculated by interpolation.

Figure 10:
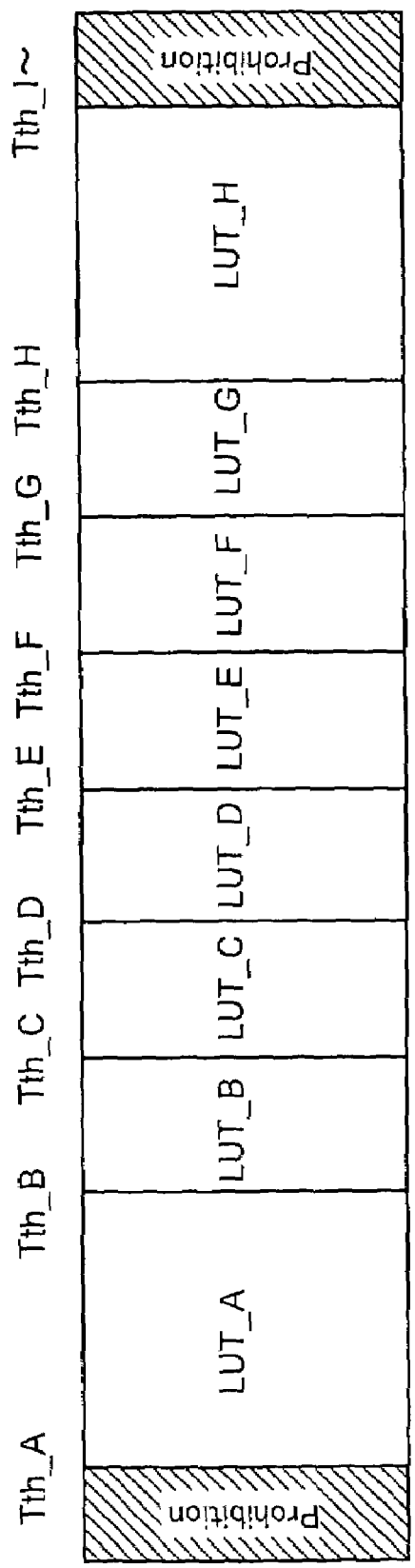
FIG. 10 shows an arrangement of a look-up table.

FIG. 10 shows look-up tables for converting the pre-print data to the print data based on the estimated temperature. Three sets of look-up tables are prepared for red, green and blue, respectively. The look-up tables are referred to in accordance with the temperature estimated by the CPU, which is the temperature estimation section. In FIG. 10, the horizontal axis indicates threshold temperatures Tth_A, . . . , Tth_I between temperature regions.

The look-up tables are stored in the flash memory 185, and the look-up tables stored in the flash memory 185 are referred to in accordance with the temperature estimated by the CPU 180. The CPU 180 refers to a look-up table corresponding to the temperature and sets print data in the print processing section 183 according to the temperature in the look-up table. In this way, conversion from the first image data to the second image data is achieved.

In the look-up tables, except for the lowest temperature region (the temperature region between Tth_A and Tth_B) in the available temperature range of the printer, the temperature regions in which correction values for converting the first image data to the second image data are recorded become narrower as the temperature decreases. A look-up table, which is associated with a temperature region including the temperature estimated by the CPU and contains print data associated with the temperature in the temperature region within a predetermined temperature range, is used for converting the pre-print data acquired by the image data acquisition section to the print data. For example, if the temperature detected by the temperature sensor lies within the region between Tth_A and Tth_B, print data corresponding to the temperature in a look-up table A (LUT_A) is referred to, and the print data is set in the print processing section 183.

The specified temperature of the printer falls within a range from 5 to 45 degrees C. However, the temperature range is expanded to 0 degrees C., because the temperature may decrease below 5 degrees C. in cold climate regions, such as Hokkaido.

The CPU 180 and the flash memory 185 storing the look-up table correspond to a data conversion section according to the present invention.

Figures 11, 12:
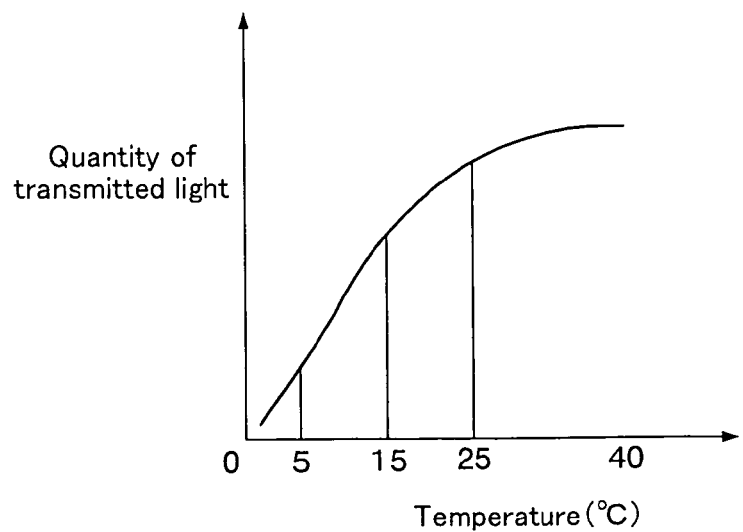
FIG. 11 is a graph showing a tendency of the quantity of transmitted light with respect to the temperature of a liquid crystal shutter.
FIG. 12 shows specific values of threshold temperatures Tth_A, . . . , Tth_I in FIG. 10.

FIG. 11 is a graph showing a tendency of the quantity of transmitted light with respect to the temperature of the liquid crystal shutter.

In FIG. 11, the vertical axis indicates the quantity of transmitted light, and the horizontal axis indicates the temperature range.

As shown in FIG. 11, at lower temperatures, the quantity of transmitted light varies abruptly with respect to the temperature, and at higher temperatures, the quantity of transmitted light varies less abruptly with respect to the temperature. In FIG. 11, the temperature of 5, 15 and 25 degrees C. on the horizontal axis are indicated by solid lines. In the temperature range between 5 and 15 degrees C., the quantity of transmitted light varies abruptly, and thus, the threshold temperatures are set at short intervals. In the temperature range between 15 and 25 degrees C., the quantity of transmitted light varies less abruptly, and thus, the threshold temperatures are set at longer intervals. At a temperature of 25 degrees C. or higher, the quantity of transmitted light varies further less abruptly, and thus, the threshold temperatures are set at further longer intervals. In this way, compensation meeting the characteristic shown in FIG. 11 can be performed with high precision.

FIG. 12 shows specific values of the threshold temperatures Tth_A, . . . , Tth_I in FIG. 10.

As shown in FIG. 12, the threshold temperature Tth_A is 0 degrees C., the threshold temperature Tth_B is 8 degrees C., and the following threshold temperatures up to 14 degrees C. are incremented by 3 degrees C. The threshold temperatures higher than 14 degrees C. increases by increasing increments, that is, 4 degrees, 5 degrees, 6 degrees and so on. Thus, a precise compensation can be made for the temperature range of 5 to 15 degrees C. shown in FIG. 11, a less precise compensation can be made for the temperature range of 15 to 25 degrees C., and a further less precise compensation can be made for the temperatures higher than 25 degrees C., at which the quantity of transmitted light does not substantially vary. In FIG. 11, the temperature data represented as 8-bit data are shown as [T.B.D] (To Be Desired), because the temperature data depend on the temperature treatment.

Furthermore, if the liquid crystal shutters have about the same temperature characteristics, there is no need to prepare a compensation table for each shutter, and thus, a large amount of memory space can be saved.

Figure 13:
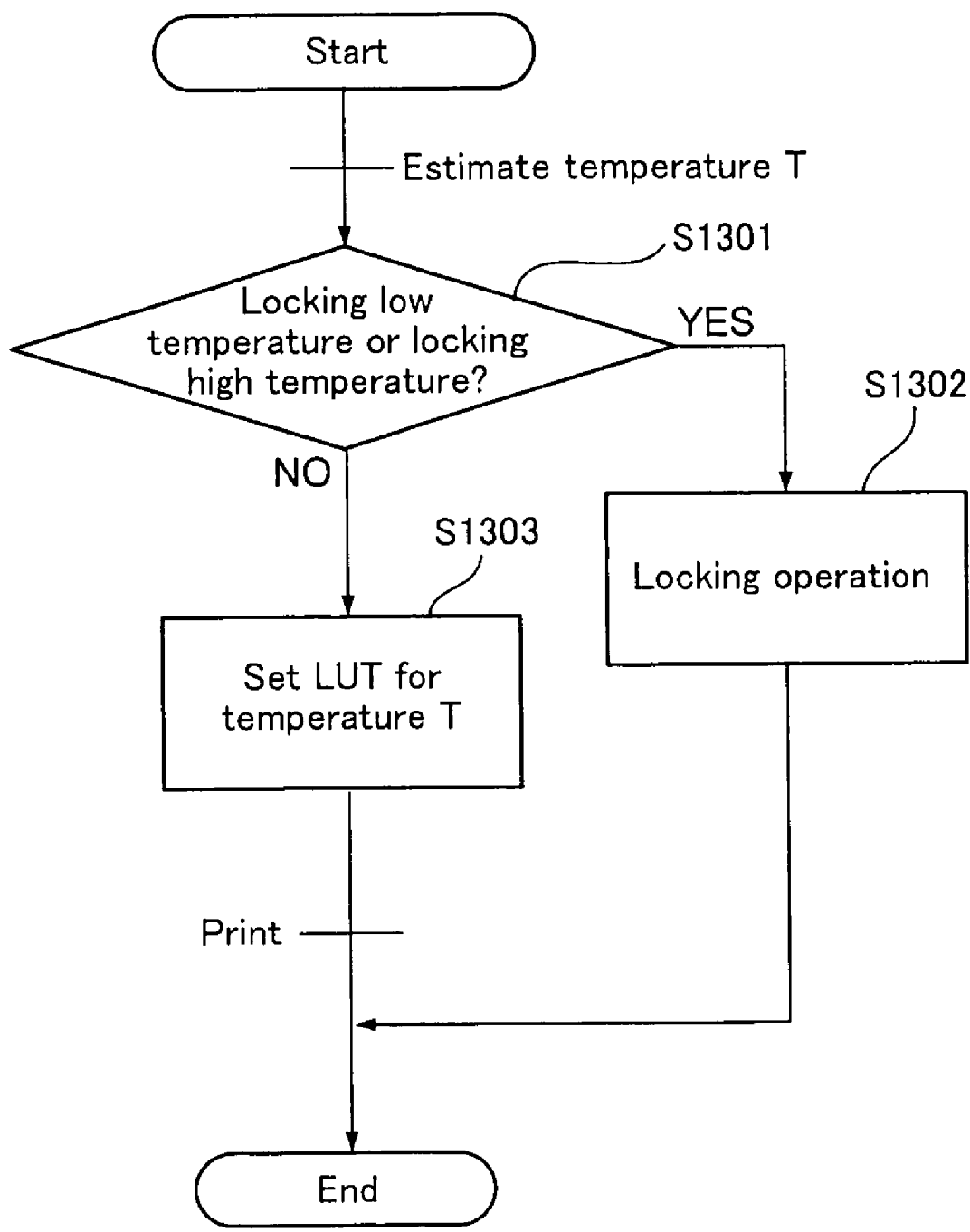
FIG. 13 is a flowchart showing a procedure performed by a CPU depending on an estimated temperature.

FIG. 13 is a flowchart showing a procedure of temperature compensation performed by the CPU using the look-up tables or the like described with reference to FIGS. 9 to 12.

First, a temperature T at the start of exposure is estimated based on a temperature detected by the temperature sensor 180A. When recording an image, in step S1301, it is determined whether the estimated temperature T lies within the specified ambient temperature range (above Tth_A and below Tth_I). If the estimated temperature T is out of the specified ambient temperature range, the printer is locked and disabled from operating. The locking temperatures are the temperatures equal to or lower than the threshold temperature Tth_A and the temperatures equal to or higher than the threshold temperature Tth_I in FIG. 10.

If the result of the determination is YES, the process continues to step S1302, in which the locking operation is performed to prohibit the processing by the image recording section, and the process of the flowchart is terminated. In this case, an error code is displayed on an LCD panel.

If it is determined that the estimated temperature T is equal to or higher than Tth_A and lower than Tth_I in step S1301, the process continues to the NO branch, and in step S1303, any of the look-up tables (any of LUT A to LUT I) which is suitable for the estimated temperature T is referred to convert the first image data to the second image data, and the second image data is set in the print processing section 183 as print data.

FIG. 14 is a table showing processings performed by the CPU 180 depending on the estimated temperature.

As shown in FIG. 14, if the estimated temperature is equal to or lower than Tth_A or equal to or higher than Tth_I, the error code is displayed on the LCD panel to inform the user that printing cannot be performed. Otherwise, the first image data is converted to the second image data depending on the temperature based on any of the look-up tables (LUT A to LUT H), and the second image data is set in the print control section as print data.

Based on the print data, the print processing section 183 controls the shutter speeds of the shutters in the liquid crystal shutter array 165 in the exposure head 16.

While the printer according to this embodiment uses instant film sheets, the present invention can be applied to any printer that records a latent image on a photosensitive material.

What is claimed is:

1. A printer having a medium loading chamber that houses a recording medium on which a latent image is formed by exposure and made visible by development, in which an image is recorded on the recording medium in the medium loading chamber by forming a latent image on the recording medium by exposure based on image data and developing the latent image, comprising:

an image data acquisition section that externally acquires first image data;

an exposure head that performs exposure of the recording medium in the medium loading chamber based on second image data to form the latent image on the recording medium;

a developing section that develops the latent image formed by the exposure head;

a temperature sensor that measures a temperature at the time when the printer is turned on, a temperature estimation section that has a plurality of pieces of temperature estimation information prepared for temperatures measured by the temperature sensor, the temperature estimation information being used for determining an estimated value of the temperature of the exposure head from the elapsed time after the turn-on, and determines an estimated value of the temperature of the exposure head depending on the elapsed time from the turn-on to the exposure based on temperature estimation information associated with the temperature measured by the temperature sensor at the time of turn-on; and image data conversion section that has a plurality of pieces of image data conversion information prepared for temperatures to compensate a variation of the quantity of exposure light applied to the recording medium due to a variation of the temperature of the exposure head and converts the first image data to the second image data based on image data conversion information associated with the estimated temperature value determined by the temperature estimation section.

2. The printer according to claim 1, wherein the temperature sensor is intended to measure the temperature in the medium loading chamber, and the exposure head is disposed integrally with the medium loading chamber in an inner wall.

3. The printer according to claim 1, wherein the printer further comprises a battery chamber in which a battery is loaded and is supplied with electric power from the battery loaded in the battery chamber.

4. The printer according to claim 1, wherein the exposure head has an array of liquid crystal shutters, and opens and closes each shutter for a period of time depending on the second image data.

5. The printer according to claim 4, wherein a shutter speed of each of the liquid crystal shutters is controlled based on the second image data.

6. The printer according to claim 1, wherein the first image data is externally sent to the image data acquisition section by infrared or USB communications.

* * * * *